(12) United States Patent
Jin et al.

(10) Patent No.: US 10,216,227 B2
(45) Date of Patent: Feb. 26, 2019

(54) FOLDABLE DISPLAY DEVICE AND ELECTRONIC APPARATUS WITH THE SAME AND CONTROL METHOD OF THE SAME

(71) Applicants: Boe Technology Group Co., Ltd., Beijing (CN); Hefei Boe Optoelectronics Technology Co., Ltd., Anhui (CN)

(72) Inventors: Ronghua Jin, Beijing (CN); Chun Wang, Beijing (CN); Yan Jiang, Beijing (CN); Yuansheng Zang, Beijing (CN); Zhi Liu, Beijing (CN); Jia Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 59 days.

(21) Appl. No.: 15/503,050

(22) PCT Filed: Sep. 28, 2016

(86) PCT No.: PCT/CN2016/100490
§ 371 (c)(1),
(2) Date: Feb. 10, 2017

(87) PCT Pub. No.: WO2017/113916
PCT Pub. Date: Jul. 6, 2017

(65) Prior Publication Data
US 2018/0120901 A1     May 3, 2018

(30) Foreign Application Priority Data

Dec. 31, 2015  (CN) .......................... 2015 1 1014207

(51) Int. Cl.
| | | |
|---|---|---|
| *G06F 1/16* | (2006.01) | |
| *G06F 3/14* | (2006.01) | |
| *G06F 3/147* | (2006.01) | |

(52) U.S. Cl.
CPC ............ *G06F 1/1641* (2013.01); *G06F 1/163* (2013.01); *G06F 1/1616* (2013.01);
(Continued)

(58) Field of Classification Search
CPC ...... G06F 1/1641; G06F 1/1616; G06F 1/163; G06F 1/1647; G06F 1/1677;
(Continued)

(56) References Cited

U.S. PATENT DOCUMENTS

| | | | | |
|---|---|---|---|---|
| 8,738,101 | B1 * | 5/2014 | Myr ................... | H04M 1/0214 379/330 |
| 2010/0201604 | A1 * | 8/2010 | Kee ....................... | G06F 1/1616 345/1.3 |

(Continued)

FOREIGN PATENT DOCUMENTS

| | | |
|---|---|---|
| CN | 1347233 | 5/2002 |
| CN | 201467182 | 5/2010 |

(Continued)

OTHER PUBLICATIONS

Second Office Action for Chinese Patent Application No. 201511014207.5 dated Jul. 19, 2017.

(Continued)

*Primary Examiner* — Tom V Sheng
(74) *Attorney, Agent, or Firm* — Calfee, Halter & Griswold LLP

(57) ABSTRACT

The present disclosure relates to a foldable display device. The foldable display device includes: a first display screen; a second display screen; a third display screen; a first connector connecting the first display screen and the second (Continued)

display screen; and a second connector connecting the second display screen and the third display screen, wherein the second display screen can rotate around the first connector and the third display screen can rotate around the second connector. According to the present disclosure, the foldable display device is provided for an electronic apparatus such as a mobile phone, a wearable device or a tablet computer, which is convenient to carry, has a switchable screen size and a low electricity consumption and long standby time.

18 Claims, 4 Drawing Sheets

(52) U.S. Cl.
CPC .......... *G06F 1/1647* (2013.01); *G06F 1/1677* (2013.01); *G06F 1/3218* (2013.01); *G06F 1/3265* (2013.01); *G06F 3/147* (2013.01); *G06F 3/1431* (2013.01); *G06F 3/1446* (2013.01); *G09G 2340/145* (2013.01)

(58) Field of Classification Search
CPC .... G06F 1/1679; G06F 1/1681; G06F 3/1446; H04M 1/0216; H04M 1/0222; H04M 1/0245
See application file for complete search history.

(56) References Cited

U.S. PATENT DOCUMENTS

| | | | |
|---|---|---|---|
| 2012/0139815 A1* | 6/2012 | Aono | G06F 1/1616 345/1.3 |
| 2013/0076591 A1* | 3/2013 | Sirpal | G06F 3/1438 345/1.3 |
| 2014/0126183 A1* | 5/2014 | Geng | G02B 5/045 362/97.1 |
| 2014/0152573 A1* | 6/2014 | Yamamoto | G06F 3/041 345/168 |
| 2015/0187338 A1* | 7/2015 | Lee | G09G 5/377 345/634 |
| 2015/0261259 A1* | 9/2015 | Endo | G06F 1/1652 361/679.06 |
| 2015/0309535 A1* | 10/2015 | Connor | G06F 1/163 361/679.03 |
| 2016/0132074 A1* | 5/2016 | Kim | G06F 1/1652 715/769 |
| 2016/0349790 A1* | 12/2016 | Connor | G06F 1/1694 |
| 2017/0115701 A1* | 4/2017 | Bae | G06F 1/1652 |

FOREIGN PATENT DOCUMENTS

| | | |
|---|---|---|
| CN | 102150095 | 8/2011 |
| CN | 203259939 | 10/2013 |
| CN | 204189088 | 3/2015 |
| CN | 105511562 | 4/2016 |
| CN | 205450883 | 8/2016 |

OTHER PUBLICATIONS

International Search Report for PCT/CN2016/100490 dated Nov. 30, 2016.
Office Action from China Application No. 201511014207.5 dated Feb. 7, 2017.
Decision of Rejection for Chinese Patent Application No. 201511014207.5 dated Dec. 8, 2017.

* cited by examiner

FOLDABLE DISPLAY DEVICE AND ELECTRONIC APPARATUS WITH THE SAME AND CONTROL METHOD OF THE SAME

RELATED APPLICATIONS

The present application is the U.S. national phase entry of the international application PCT/CN2016/100490, with an international filing date of Sep. 28, 2016, which claims the benefit of a Chinese Patent Application No. 201511014207.5, filed on Dec. 31, 2015, the entire disclosure of which is incorporated herein by reference.

FIELD OF THE DISCLOSURE

The present disclosure relates to the field of display, in particular to a foldable display device and its control method, and also relates to an electronic apparatus provided with such foldable display devices, such as a mobile phone, a wearable device, a tablet computer and the like with such a foldable display device.

DESCRIPTION OF THE PRIOR ART

Recently, with the rapid development of the mobile phone market, mobile phones are widely used among consumers. In order to provide aesthetics and visibility of the display, the display screens are becoming larger and larger. Currently, the screens of mobile phones have been increased from 3 inches to 6 inches or even larger. Larger screen can provide better visual experience, however it can also cause other problems, such as:

- it is inconvenient to carry, cannot put into pocket easily and can easily slide down from hand when held in hand;
- electricity is quickly consumed due to larger screen; and
- it generally incorporates into an intelligent wearable device, which can increase cost etc.

In addition, generally, the screens used in the wearable devices are small, which is uncomfortable to those accustomed to larger display screens. It is also desired to have larger display screen devices which can be used on wearable devices.

SUMMARY OF THE DISCLOSURE

In light of the above problems, the objects of the present disclosure is to provide a foldable display device which can meet the user's requirements of reducing electricity consumption of the screens and realizing larger screen display, and provide an electronic apparatus using such a foldable display device.

The present disclosure provides a foldable display device, comprising:

a first display screen; a second display screen; a third display screen; a first connector connecting the first display screen and the second display screen, and a second connector connecting the second display screen and the third display screen; wherein the second display screen can rotate around the first connector and the third display screen can rotate around the second connector.

According to an aspect of the present disclosure, the foldable display device can have a first state, a second state and a third state.

In the first state, the first display screen, the second display screen and the third display screen are connected side by side in sequence by the first connector and the second connector and the respective display surfaces of the first display screen, the second display screen and the third display screen are arranged in a first plane in sequence.

In the second state, the third display screen can be folded and abutted against the second display screen by means of the second connector so that the display surfaces of the first display screen and the second display screen are arranged in the first plane in sequence and the display surface of the third display screen is facing a direction opposite to the first plane.

In the third state, the second display screen and the third display screen can be folded and overlapped with the first display screen by means of the first connector and the second connector so that the display surface of the third display screen is in the first plane and the display surface of the first display screen and the display surface of the second display screen are overlapped to each other.

According to an aspect of the present disclosure, the foldable display device has a fourth state. In this state, the display surface of the first display screen is in a first plane, the respective display surfaces of the second display screen and the third display screen are arranged in a second plane in sequence; and the included angle between the first plane and the second plane is larger than 0 degree and smaller than 180 degree.

According to an aspect of the present disclosure, the foldable display device has a fifth state. In this state, the display surfaces of the first display screen and the second display screen are arranged in the first plane in sequence, the display surface of the third display screen is in a third plane, and the included angle between the first plane and the third plane is larger than 0 degree and smaller than 180 degree.

According to an aspect of the present disclosure, the foldable display device has a sixth state. In this state, the display surface of the first display screen is in the first plane, the display surface of the second display screen is in a fourth plane, the display surface of the third display screen is in a fifth plane; the included angle between the first plane and the fourth plane is larger than 0 degree and smaller than 180 degree, and the included angle between the fourth plane and the fifth plane is larger than 0 degree and smaller than 180 degree.

According to an aspect of the present disclosure, the sizes of the display surfaces of the first display screen, the second display screen and the third display screen are the same.

According to an aspect of the present disclosure, the sum of the thicknesses of the second display screen and the third display screen is equal to the thickness of the first display screen.

According to an aspect of the present disclosure, the first display screen, the second display screen and the third display screen are independent to each other.

According to an aspect of the present disclosure, the first connector and the second connector are used to provide signals and power.

According to an aspect of the present disclosure, the signal lines and power supplies of the first display screen, the second display screen and the third display screen are independent to each other.

According to an aspect of the present disclosure, in the first state, the first display screen, the second display screen and the third display screen operate;

in the second state, the first display screen and the second display screen operate and the third display screen selectively operates or does not operate;

In the third state, only the third display screen operates.

According to an aspect of the present disclosure, the second connector is provided at the back faces of the third display screen and the second display screen, and the first connector is provided at the side faces or back faces of the first display screen and the second display screen.

According to an aspect of the present disclosure, the junction between the first display screen and the second display screen and the junction between the second display screen and the third display screen employ frameless designs.

According to an aspect of the present disclosure, the junction between the first display screen and the second display screen and the junction between the second display screen and the third display screen employ frames whose width is no larger than 1 mm.

According to an aspect of the present disclosure, the foldable display device comprises:

a first sensor which is used to sense whether the first connector is in a folded state or in an unfolded state;

a second sensor which is used to sense whether the second connector is in a folded state or in an unfolded state;

a display control module which is used to control whether the first display screen, the second display screen or the third display screen should display according to the sense results of the first sensor and the second sensor.

According to an aspect of the present disclosure, when the first connector is sensed in the unfolded state by the first sensor and the second connector is sensed in the unfolded state by the second sensor, the first display screen, the second display screen and the third display screen are controlled to operate by the display control module;

when the first connector is sensed in the unfolded state by the first sensor and the second connector is sensed in the folded state by the second sensor, the first display screen and the second display screen are controlled to operate and the third display screen is selectively controlled to operate or not operate by the display control module;

when the first connector is sensed in the folded state by the first sensor and the second connector is sensed in the folded state by the second sensor, the first display screen and the second display screen are controlled not to operate and only the third display screen is controlled to operate by the display control module.

The present disclosure also provides an apparatus provided with the aforementioned foldable display device. The apparatus of the present disclosure comprises: a foldable device, a mobile phone and a tablet computer.

The present disclosure also provides a method of controlling the above mentioned foldable display device, wherein the control method comprises the following steps:

a first sensing step of sensing whether the first connector is in folded state or unfolded state;

a second sensing step of sensing whether the second connector is in folded state or in unfolded state;

a display control step of controlling whether the first display screen, the second display screen and the third display screen should display according to the sense results of the first sensing step and the second sensing step.

According to an aspect, when the first connector is sensed in the unfolded state in the first sensing step and the second connector is sensed in the unfolded state in the second sensing step, the first display screen, the second display screen and the third display screen are controlled to operate in the display control step;

When the first connector is sensed in the unfolded state in the first sensing step and the second connector is sensed in the folded state in the second sensing step, the first display screen and the second display screen are controlled to operate and the third display screen is selectively controlled to operate or not operate in the display control step;

When the first connector is sensed in the folded state in the first sensing step and the second connector is sensed in the folded state in the second sensing step, the first display screen, the second display screen are controlled not to operate and only the third display screen is controlled to operate in the display control step.

According to the present disclosure, the foldable display device is provided for an electronic apparatus such as mobile phone, a wearable device or a tablet computer, which is convenient to carry, has a switchable screen size and a low electricity consumption, and long standby time.

DETAILED DESCRIPTION OF THE PRESENT DISCLOSURE

The following will describe some of the embodiments of the present disclosure. The description of these embodiments is to provide basic understanding of the present disclosure but not identify key or decisive elements of the present disclosure nor define the protection scope of the present disclosure.

Figure 1:
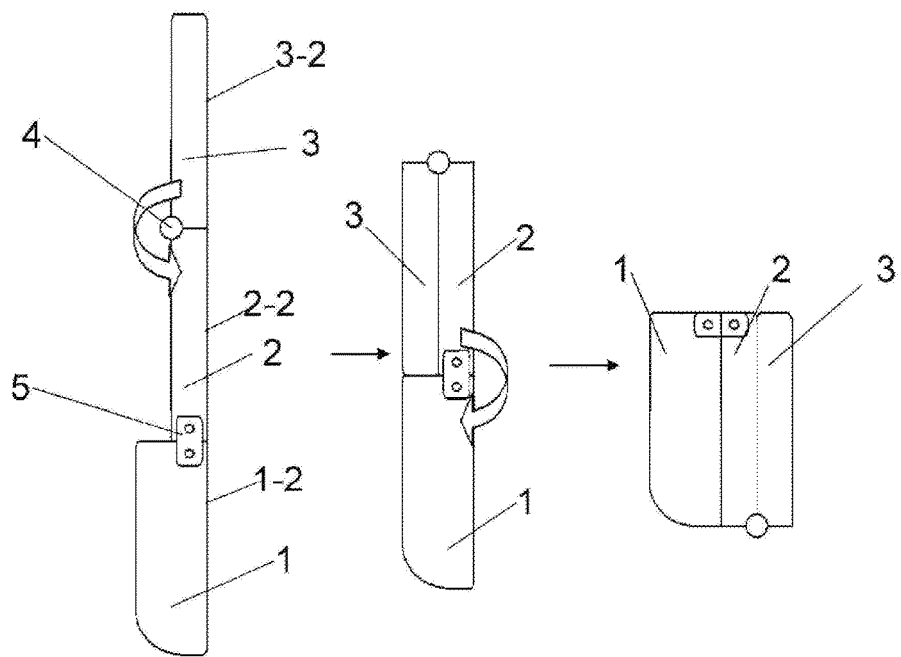
FIG. 1 is a schematic view showing the construction and the states of a foldable display device according to the present disclosure.

FIG. 1 is a schematic view showing the construction and the states of a foldable display device according to the present disclosure. FIG. 1 shows a first state, a second state and a third state. In the first state, the foldable display device is in an extended state. In the second state, the foldable display device is in a double-folded state. In the third state, the foldable display device is in a triple folded state.

As shown in FIG. 1, the foldable display device according to the present disclosure comprises: a first display screen 1; a second display screen 2; a third display screen 3; a first connector 5 hinging or articulating the first display screen and the second display screen; and a second connector 4 hinging or articulating the second display screen and the third display screen. By means of the first connector 5 and the second connector 4, the foldable display device of the present disclosure has the extended state (the first state), the double folded state (the second state) and the triple folded state (the third state).

The extended state of the foldable display device represented in the first state shown in FIG. 1 is as follows: the display surface 1-2 of the first display screen 1, the display surface 2-2 of the second display screen 2 and the display surface 3-2 of the third display screen 3 are hinged side by side in sequence through hinge actions by means of the first connector 5 and the second connector 4. Furthermore, the display surface 1-2 of the first display screen 1, the display surface 2-2 of the second display screen 2 and the display surface 3-2 of the third display screen 3 are facing the same direction and this direction is called a primary display direction (the arrow direction in FIG. 1). That is, the respective display surfaces 1-2, 2-2, 3-2 of the first display screen 1, the second display screen 2 and the third display screen 3 are arranged in the same first plane in sequence. In the present disclosure, the "first plane" is a plane to which the arrows in FIG. 1 are directed. In this extended state, the display screen 1, the display screen 2 and the display screen 3 are in the same first plane side by side, and operate (in ON state; or to display) in the primary display direction simultaneously.

After that, the double folded state represented in the second state in FIG. 1 is as follows: from the above mentioned extended state, i.e., the first state, the third display screen 3 can be turned in a direction opposite to the primary display direction, that is, towards the back face by means of the second connector 4 so that the display surface 3-2 of the third display screen 3 is facing the back face, i.e., facing a direction opposite to the primary display direction (this opposite direction is called secondary display direction herein). At the same time, only the display directions of the display surface 1-2 of the first display screen 1 and the display surface 2-2 of the second display screen 2 are towards the primary display direction. That is to say, only the display surface 1-2 of the first display screen 1 and the display surface 2-2 of the second display screen 2 are arranged in the same first plane. In this double folded state, the display screen 1 and the display screen 2 can operate in the primary display direction, while the display screen 3 selectively operates or does not operate in the secondary display direction.

Then, the triple folded state represented in FIG. 1 is as follows: from the above mentioned double folded state, i.e., the second state, the second display screen 2 and the turned and folded third display screen 3 can rotate in the primary display direction together through the first connector 5 and can be folded so that the display direction of the display screen 3-2 of the third display screen 3 is towards the primary display direction, that is, only the display surface 3-2 of the third display screen 3 is in the first plane, while the display screen 1-2 of the first display screen 1 and the display screen 2-2 of the second display screen 2 are facing each other and do not operate.

In addition to the first state, the second state and the third state shown in FIG. 1, the foldable display device of the present disclosure can be transformed in various ways to have other states. The following will describe other states of the foldable display device of the present disclosure.

Figure 2:
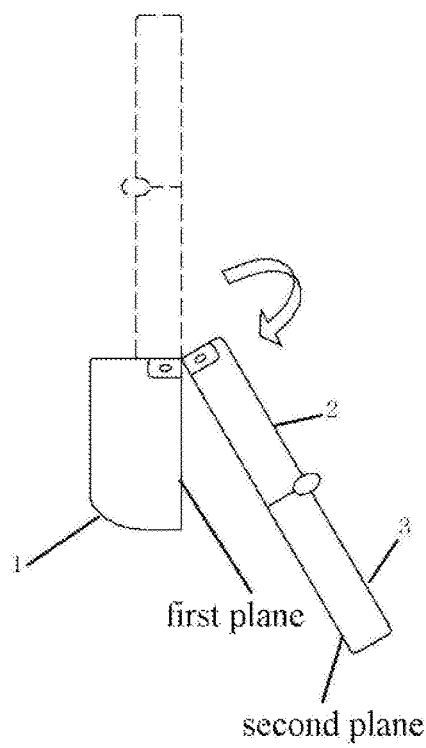
FIG. 2 is a schematic view showing other states of the foldable display device according to the present disclosure.
Figure 2:
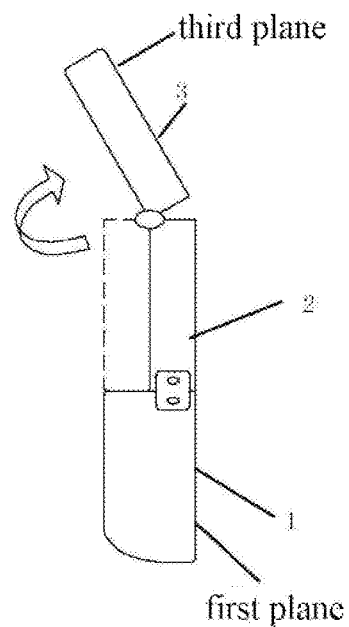
Figure 2:
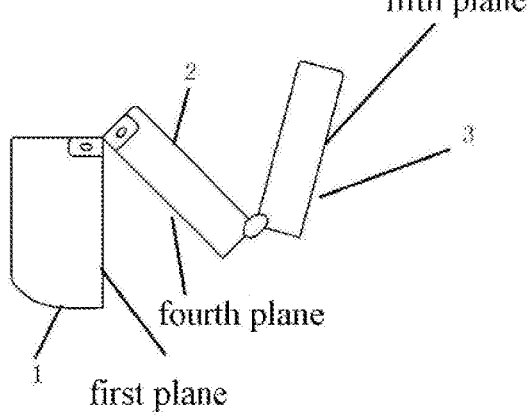

FIG. 2 is a schematic view showing other states of the foldable display device of the present disclosure. FIG. 2 shows a fourth state, a fifth state and a sixth state.

Figure 4:
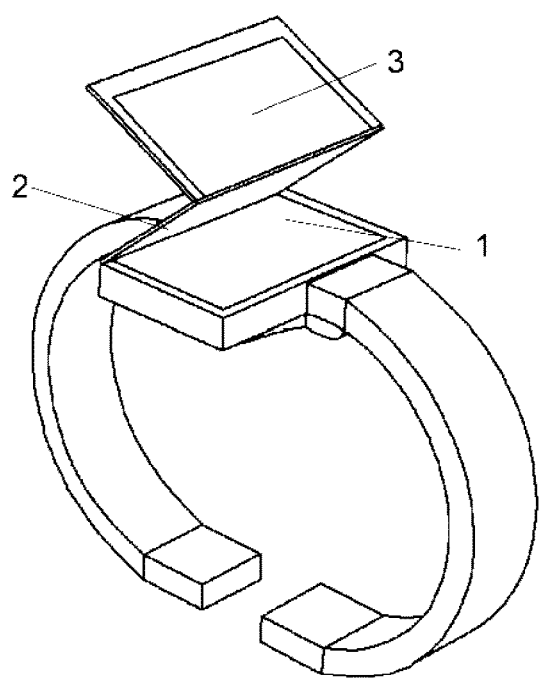

As shown in the fourth state in FIG. 4, in the fourth state of the foldable display device of the present disclosure, the display surface of the first display screen 1 is in a first plane, the respective display surfaces of the second display screen 2 and the third display screen 3 are arranged in a second plane in sequence; and the included angle between the first plane and the second plane is larger than 0 degree and smaller than 180 degree. In the fourth state, the second display screen 2 and the third display screen 3 operate and the first display screen 1 selectively operates or does not operate.

As shown in the fifth state in FIG. 2, in the fifth state of the foldable display device according to the present disclosure, the display surfaces of the first display screen 1 and the second display screen 2 are arranged in the first plane in sequence, the display surface of the third display screen 3 is in a third plane, and the included angle between the first plane and the third plane is larger than 0 degree and smaller than 180 degree. In the fifth state, the first display screen 1 and the second display screen 2 operate and the third display screen 3 selectively operates or does not operate.

As shown in the sixth state in FIG. 2, in the sixth state of the foldable display device according to disclosure, the display surface of the first display screen 1 is in the first plane, the display surface of the second display screen 2 is in a fourth plane, the display surface of the third display screen 3 is in a fifth plane; the included angle between the first plane and the fourth plane is larger than 0 degree and smaller than 180 degree, and the included angle between the fourth plane and the fifth plane is larger than 0 degree and smaller than 180 degree. In the sixth state, the first display screen 1, the second display screen 2 and the third display screen 3 can selectively operate or not operate.

In FIG. 2, the included angle between the first plane and the second plane in the fourth state and the included angle between the first plane and the fourth plane in the sixth state which are larger than 0 degree and smaller than 180 degree can be achieved in the following ways: the first connector 4 can be designed to be a hinge mechanism that has a damping member and can be adjusted steplessly, or alternatively the first connector 4 can be designed to be a hinge mechanism that has a stop member and can be adjusted in steps. Similarly, the included angle between the first plane and the third plane in the fifth state and the included angle between the fourth plane and the fifth plane in the sixth state which are larger than 0 degree and smaller than 180 degree can be achieved in the following ways: the second connector 5 can be designed to be a hinge mechanism that has a damping member and can be adjusted steplessly, or the second connector 5 can be designed to be a hinge mechanism that has a stop member and can be adjusted in steps. Of course, it can also be achieved by any other angle adjust mechanism designed by those skilled in the art without creative efforts.

The following will describe how to control the display screens of the foldable display device according to the present disclosure.

The foldable display device of the present disclosure further comprises:

a first sensor (not shown) which is used to sense whether the first connector 5 is in a folded state or in an unfolded state;

a second sensor (not shown) which is used to sense whether the second connector 4 is in a folded state or in an unfolded state; and a display control module (not shown) which is used to control whether the first display screen 1, the second display screen 2 or the third display screen 3 should display according to the sense results of the first sensor and the second sensor.

Specifically, when the first connector 5 is sensed in the unfolded state by the first sensor and the second connector 1 is sensed in the unfolded state by the second sensor, the first display screen 1, the second display screen 2 and the third display screen 3 are controlled to operate by the display control module;

when the first connector 5 is sensed in the unfolded state by the first sensor and the second connector 4 is sensed in the folded state by the second sensor, the first display screen 1 and the second display screen 2 are controlled to operate and the third display screen 3 is selectively controlled to operate or not operate (for example, "do you want to use a back screen?" can be displayed on the first display screen 1 and/or the second display screen 2, and then the user can choose whether the third display screen 3 should operate or not) by the display control module;

when the first connector is sensed in the folded state by the first sensor and the second connector is sensed in the folded state by the second sensor, the first display screen and the second display screen are controlled not to operate and only the third display screen is controlled to operate by the display control module. Furthermore, referring to the fourth state to the sixth state shown in FIG. 2, the first connector 5 can be sensed in partially unfolded and partially folded state (that is, the included angle between the first plane and the second plane in the fourth state and the included angle between the first plane and the fourth plane in the sixth state are larger than 0 degree and smaller than 180 degree) by the first sensor or when the second connector 4 is sensed in partially unfolded and partially folded state (that is, the included angle between the second plane and the third plane in the fifth state and the included angle between the fourth plane and the fifth plane in the sixth state are larger than 0 degree and smaller than 180 degree) by the second sensor, the first display screen 1, the second display screen 2 and the third display screen 3 can be controlled according to actual need by the display control module. For example, in the fourth state, the second display screen 2 and the third display screen 3 can operate and the first display screen 1 can be selectively controlled to operate or not operate. In the fifth state, the first display screen 1 and the second display screen 2 can operate and the third display screen 3 can be selectively controlled to operate or not operate. In the sixth state, the first display screen 1, the second display screen 2 and the third display screen 3 can be selectively controlled to operate or not operate.

In another aspect, in order to achieve the double folded state and triple folded state, the sizes of the display screens of the first display screen 1, the second display screen 2 and the third display screen 3 are the same. Furthermore, optionally, the sum of the thicknesses of the second display screen 2 and the third display screen 3 is equal to the thickness of the first display screen 1.

In present disclosure, the first display screen 1, the second display screen 2 and the third display screen 3 are independent to each other. Specifically, the first display screen 1, the second display screen 2 and the third display screen 3 are hinged to each other mechanically but each screen is separate. Respective signal lines and power supplies of the first display screen 1, the second display screen 2 and the third display screen 3 are independent to each other electrically.

Furthermore, in order to optimize the display effects at the junction(s) between the first display screen 1, the second display screen 2 and the third display screen 3 in the extended state or the double folded state when three screens or two screens display together, the junction between the first display screen and the second display screen and the junction between the second display screen and the third display screen employ frame free design or narrow frame design (herein, narrow frame design means the width of the frame is equal to or less than 1 mm). In this way, in the extended state or the double folded state, the junction between the first display screen and the second display screen and the junction between the second display screen and the third display screen can display relatively seamlessly or almost seamlessly, thereby to provide excellent display effects.

As to the first connector 5 and the second connector 4, the second connector 4 is optionally disposed behind the second display screen 2 and the third display screen 3, so that the second connector 4 can be disposed to hinge the third display screen 3 and the second display screen 2 without interfering the display of the display screen. The first connector 5 can be disposed at the back faces of the first display screen 1 and the second display screen 2 without impeding the backwards turning and folding of the third display screen 3. Of course, the first connector 5 can be disposed at the side faces of the first display screen 1 and the second display screen 2. Furthermore, the first connector 5 and the second connector 4 can also be used to provide signals and power.

The following will describe how the foldable display device is applied to a mobile phone.

The foldable display device of the present disclosure shown in FIG. 1 can be used a screen of a mobile phone. In this way, in the first state, the display surface 1-2 of the first display screen 1, the display surface 2-2 of the second display screen 2 and the display surface 3-2 of the third display screen 3 can be connected side by side in sequence and face the same direction, that is, the primary display direction. The entire picture can be formed by coordinating the display of the three display screens.

In the second state, i.e., the double folded state, the third display screen 3 can be folded backwards. Then the display surface 1-2 of the first display screen and the display surface 2-2 of the second display screen 2 can constitute a front face display screen, and the display surface 3-2 of the third display screen can constitute a back face display screen. The display surface 1-2 of the first display screen 1 and the display surface 2-2 of the second display screen 2 can work or display together by algorithm coordinating and the display surface 3-2 of the third display screen 3 can selectively operate or not operate. When the display surface 3-2 of the third display screen 3 operates, it can be used as a secondary display at the back face of the mobile phone. When the third display screen 3 does not operate, because only the first display screen 1 and the second display screen operate, the power consumption can be reduced and in this double folded state, the size of the display screen of the device can be reduced by one third, which is convenient to carry.

In the third state, i.e., the triple folded state, the second display screen 2 and the third display screen 3 can be folded down together, using the first connector 5 as a pivot. The display surface 1-2 of the first display screen 1 and the display surface 2-2 of the second display screen are overlapped to each other. The display surface 3-2 of the third display screen 3 can be used as a front face of the display screen of the mobile phone. In this state, the size of the display screen of the mobile phone can be reduced by ⅔ from the first state, which is more convenient to hold and carry. Furthermore, in the triple folded state, the screens of the display surface 1-2 of the first display screen 1 and the display surface 2-2 of the second display screen 2 do not operate, which can reduce the power consumption by 70 percent.

The following will describe a method of controlling the foldable display device. The control method comprises:

a first sensing step of sensing whether the first connector is in folded state or unfolded state;

a second sensing step of sensing whether the second connector is in folded state or in unfolded state;

a display control step of controlling whether the first display screen, the second display screen and the third display screen should display according to the sense results of the first sensing step and the second sensing step.

According to an aspect of the present disclosure, when the first connector is sensed in the unfolded state in the first sensing step and the second connector is sensed in the unfolded state in the second sensing step, the first display screen, the second display screen and the third display screen are controlled to operate in the display control step;

When the first connector is sensed in the unfolded state in the first sensing step and the second connector is sensed in the folded state in the second sensing step, the first display screen and the second display screen are controlled to operate and the third display screen is selectively controlled to operate or not operate in the display control step;

When the first connector is sensed in the folded state in the first sensing step and the second connector is sensed in the folded state in the second sensing step, the first display screen, the second display screen are controlled not to operate and only the third display screen is controlled to operate in the display control step.

Figure 3:
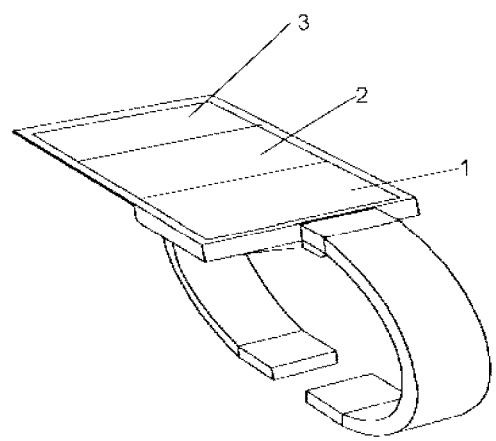
FIGS. 3 to 5 are schematic views showing the situations that the foldable display device according to the present disclosure is applied to a smart watch.
Figure 5:
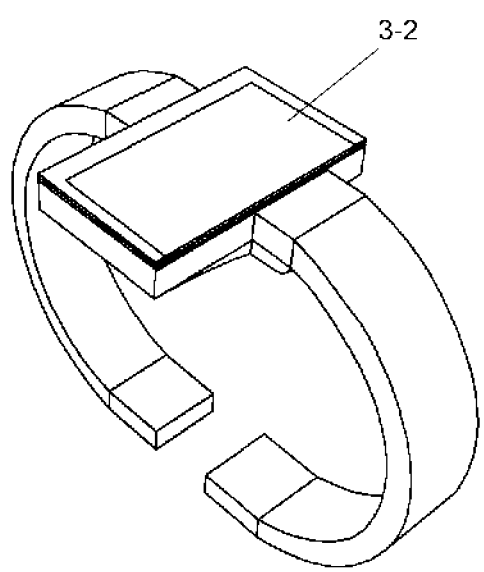

The following will describe how the foldable display device of the present disclosure applies to a wearable device. FIGS. 3 to 5 are schematic views showing how the foldable display device is applied to a smart watch.

In FIG. 3 to FIG. 5, a band of the smart watch is installed at an upper side and a lower side of the first display screen 1. As shown in FIG. 3, in an extended state of the display screen of the smart watch, three display screens are unfolded side by side, and can make maximum display. As shown in FIG. 4, the third display screen 3 can be turned backwards, thereby to achieve double folded state. On this basis, the second display screen 2 can be turned forwards to realize triple folded state. FIG. 5 shows the state that only the display surface 3-2 of the third display screen is at the display surface side in the triple folded state. In this way, a smart watch can be provided that can have big screen display without increasing the size of the smart watch by means of the foldable display device.

As described above, the present disclosure provides a foldable display device. The foldable display device can be used as screens of an electronic apparatus such as a mobile phone, a wearable device or a tablet computer, which is convenient to carry, has switchable screen sizes and low electricity consumption, and long standby time.

The above examples mainly describe the foldable display device and its control method of the present disclosure. Although some specific embodiments of the present disclosure have been described, those skilled in the art can understand that the present disclosure can be implemented in other ways without departing from the spirit and scope of the present disclosure. Therefore, the provided examples and embodiments are considered as illustrating instead of limiting. Various modifications and substitutions are covered by the present disclosure without departing from the spirit and scope defined by the claims.

The invention claimed is:

1. A foldable display device comprising: a first display screen;
a second display screen; a third display screen; a first connector connecting the first display screen and the second display screen, and a second connector connecting the second display screen and the third display screen;
wherein the second display screen can rotate around the first connector and the third display screen can rotate around the second connector, and
wherein the foldable display device further comprises:
a first sensor which is used to sense whether the first connector is in a folded state or in an unfolded state;
a second sensor which is used to sense whether the second connector is in folded state or in unfolded state;
a display control module which is used to control whether the first display screen, the second display screen and the third display screen should display according to sense results of the first sensor and the second sensor.

2. The foldable display device according to claim 1, wherein:
sizes of display surfaces of the first display screen, the second display screen and the third display screen are the same.

3. The foldable display device according to claim 1, wherein:
the sum of the thicknesses of the second display screen and the third display screen is equal to the thickness of the first display screen.

4. The foldable display device according to claim 1, wherein:
the first display screen, the second display screen and the third display screen are connected side by side in sequence by the first connector and the second connector, and respective display surfaces of the first display screen, the second display screen and the third display screen are arranged in a first plane in sequence.

5. The foldable display device according to claim 1, wherein:
display surfaces of the first display screen and the second display screen are arranged in a first plane in sequence; the third display screen is folded and abutted against the second display screen by means of the second connector, a display surface of the third display screen is facing a direction opposite to the display surface of the second display screen.

6. The foldable display device according to claim 1, wherein:
a display surface of the first display screen is in a first plane; the first display screen, the second display screen and the third display screen are stacked in sequence; the second display screen and the third display screen are folded and abutted against each other by means of the second connector; the second display screen and the first display screen are folded and abutted against each other by means of the first connector; directions of the display surface of the first display screen and a display surface of the second display screen are opposite, directions of the display surface of the first display screen and a display surface of the third display screen are the same.

7. The foldable display device according to claim 1, wherein:
a display surface of the first display screen is in a first plane, respective display surfaces of the second display screen and the third display screen are arranged in a second plane in sequence; and an included angle between the first plane and the second plane is larger than 0 degree and smaller than 180 degree.

8. The foldable display device according to claim 1, wherein:
display surfaces of the first display screen and the second display screen are arranged in a first plane in sequence, a display surface of the third display screen is in a third plane, and an included angle between the first plane and the third plane is larger than 0 degree and smaller than 180 degree.

9. The foldable display device according to claim 1, wherein:
a display surface of the first display screen is in a first plane, a display surface of the second display screen is in a fourth plane, a display surface of the third display screen is in a fifth plane; an included angle between the first plane and the fourth plane is larger than 0 degree and smaller than 180 degree, an included angle between the fourth plane and the fifth plane is larger than 0 degree and smaller than 180 degree.

10. The foldable display device according to claim 1, wherein:
the first display screen, the second display screen and the third display screen are independent to each other.

11. The foldable display device according to claim 10, wherein:
respective signal lines and power supplies of the first display screen, the second display screen and the third display screen are independent to each other.

12. The foldable display device according to claim 10, wherein:
the first connector and the second connector are also used to provide signals and power.

13. The foldable display device according to claim 1, wherein:
the second connector is provided at back faces of the third display screen and the second display screen, the first connector is provided at side faces or back faces of the first display screen and the second display screen.

14. The foldable display device according to claim 1, wherein:
a junction between the first display screen and the second display screen and a junction between the second display screen and the third display screen employ frameless designs.

15. The foldable display device according to claim 1, wherein:
a junction between the first display screen and the second display screen and a junction between the second display screen and the third display screen employ frames whose widths are no larger than 1 mm.

16. An apparatus which comprises a foldable display device comprising: a first display screen; a second display screen; a third display screen; a first connector connecting the first display screen and the second display screen, and a second connector connecting the second display screen and the third display screen;
wherein the second display screen can rotate around the first connector and the third display screen can rotate around the second connector, and
wherein the foldable display device further comprises:
a first sensor which is used to sense whether the first connector is in a folded state or in an unfolded state;
a second sensor which is used to sense whether the second connector is in folded state or in unfolded state;
a display control module which is used to control whether the first display screen, the second display screen and the third display screen should display according to sense results of the first sensor and the second sensor.

17. A method of controlling a foldable display device comprising: a first display screen; a second display screen; a third display screen; a first connector connecting the first display screen and the second display screen, and a second connector connecting the second display screen and the third display screen; wherein the second display screen can rotate around the first connector and the third display screen can rotate around the second connector,
wherein the control method comprises the following steps:
a first sensing step of sensing whether the first connector is in a folded state or an unfolded state;
a second sensing step of sensing whether the second connector is in a folded state or in an unfolded state;
a display control step of controlling whether the first display screen, the second display screen and the third display screen should display according to sense results of the first sensing step and the second sensing step.

18. The control method according to claim 17, wherein
when the first connector is sensed in the unfolded state in the first sensing step and the second connector is sensed in the unfolded state in the second sensing step, the first display screen, the second display screen and the third display screen are controlled to operate in the display control step;
when the first connector is sensed in the unfolded state in the first sensing step and the second connector is sensed in the folded state in the second sensing step, the first display screen and the second display screen are controlled to operate and the third display screen is selectively controlled to operate or not operate in the display control step;
when the first connector is sensed in the folded state in the first sensing step and the second connector is sensed in the folded state in the second sensing step, the first display screen, the second display screen are controlled not to operate and only the third display screen is controlled to operate in the display control step.

* * * * *